US011868068B2

(12) United States Patent
Miyashita

(10) Patent No.: US 11,868,068 B2
(45) **Date of Patent: *Jan. 9, 2024**

(54) IMAGE FORMING APPARATUS WITH HEATING BODY ARRANGEMENT INCLUDING HIGH CONDUCTIVITY HEAT TRANSMISSION ARRANGEMENT LONGITUDINALLY WIDER THAN A HEATER SUBSTRATE

(71) Applicant: TOSHIBA TEC KABUSHIKI KAISHA, Tokyo (JP)

(72) Inventor: Kousei Miyashita, Sunto Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/729,503

(22) Filed: Apr. 26, 2022

(65) Prior Publication Data

US 2022/0253007 A1 Aug. 11, 2022

Related U.S. Application Data

(63) Continuation of application No. 17/171,832, filed on Feb. 9, 2021, now Pat. No. 11,340,545.

(51) Int. Cl.
*G03G 15/20* (2006.01)
*G03G 15/01* (2006.01)

(52) U.S. Cl.
CPC ..... *G03G 15/2053* (2013.01); *G03G 15/0105* (2013.01); *G03G 15/2039* (2013.01)

(58) Field of Classification Search
CPC ....................... G03G 15/2053; G03G 15/2042
See application file for complete search history.

(56) References Cited

U.S. PATENT DOCUMENTS 9,217,971 B1 12/2015 Matsumoto et al.
10,732,550 B2 8/2020 Miyauchi et al.
(Continued)

FOREIGN PATENT DOCUMENTS

EP 3470930 A1 * 4/2019 ......... G03G 15/2028
JP 2015-102718 A 6/2015
JP 2020-122939 A 8/2020

OTHER PUBLICATIONS

U.S. Notice of Allowance on U.S. Appl. No. 17/171,832 dated Jan. 27, 2022.

(Continued)

*Primary Examiner* — Arlene Heredia
(74) *Attorney, Agent, or Firm* — FOLEY & LARDNER LLP

(57) ABSTRACT

An image forming apparatus includes an image forming unit, a film-shaped cylindrical body, a heating body unit, a first member, and a control unit. The image forming unit forms an image on a sheet. The cylindrical body has a sheet-passing region coming into contact with the sheet to fix the image to the sheet moving in a first direction. The cylindrical body is broader than the sheet-passing region in a second direction orthogonal to the first direction. The heating body unit includes a heating body and comes into contact with a first surface inside the cylindrical body. The first member is disposed on a second surface opposite to the first surface of the heating body. The first member has an outer end disposed outside an outer end of the sheet-passing region in the second direction. The control unit allows the heating body to generate heat inside the outer end of the sheet-passing region in the second region.

18 Claims, 6 Drawing Sheets

(56) References Cited

U.S. PATENT DOCUMENTS

| | | | |
|---|---|---|---|
| 2015/0227091 | A1 | 8/2015 | Ando et al. |
| 2019/0056686 | A1 | 2/2019 | Yagi |
| 2020/0209791 | A1 | 7/2020 | Seki |

OTHER PUBLICATIONS

U.S. Office Action on U.S. Appl. No. 17/171,832 dated Aug. 25, 2021.

* cited by examiner

IMAGE FORMING APPARATUS WITH HEATING BODY ARRANGEMENT INCLUDING HIGH CONDUCTIVITY HEAT TRANSMISSION ARRANGEMENT LONGITUDINALLY WIDER THAN A HEATER SUBSTRATE

CROSS-REFERENCE TO RELATED APPLICATION

This application is a continuation of co-pending U.S. application Ser. No. 17/171,832, filed on Feb. 9, 2021, the entire contents of which are incorporated herein by reference.

FIELD

Embodiments described herein relate generally to an image forming apparatus.

BACKGROUND

Image forming apparatus that form images on sheets (papers) are used. Image forming apparatus include a fixing device that fixes toners (recording agents) to sheets. Image forming apparatuses capable of inhibiting an excessive increase in temperature in non-sheet passing regions of fixing devices are required.

DETAILED DESCRIPTION

According to at least one embodiment, an image forming apparatus includes an image forming unit (image former), a film-shaped cylindrical body, a heating body unit (arrangement), a first member, and a control unit (controller). The image forming unit forms an image on a sheet. The cylindrical body has a sheet-passing region coming into contact with the sheet to fix the image to the sheet moving in a first direction. The cylindrical body is broader than the sheet-passing region in a second direction orthogonal to the first direction. The heating body unit includes a heating body and comes into contact with a first surface inside the cylindrical body. The first member is disposed on a second surface opposite to the first surface of the heating body. The first member has an outer end disposed outside an outer end of the sheet-passing region in the second direction. The control unit allows the heating body to generate heat inside the outer end of the sheet-passing region in the second region.

Hereinafter, an image forming apparatus according to an embodiment will be described with reference to the drawings.

Figure 1:
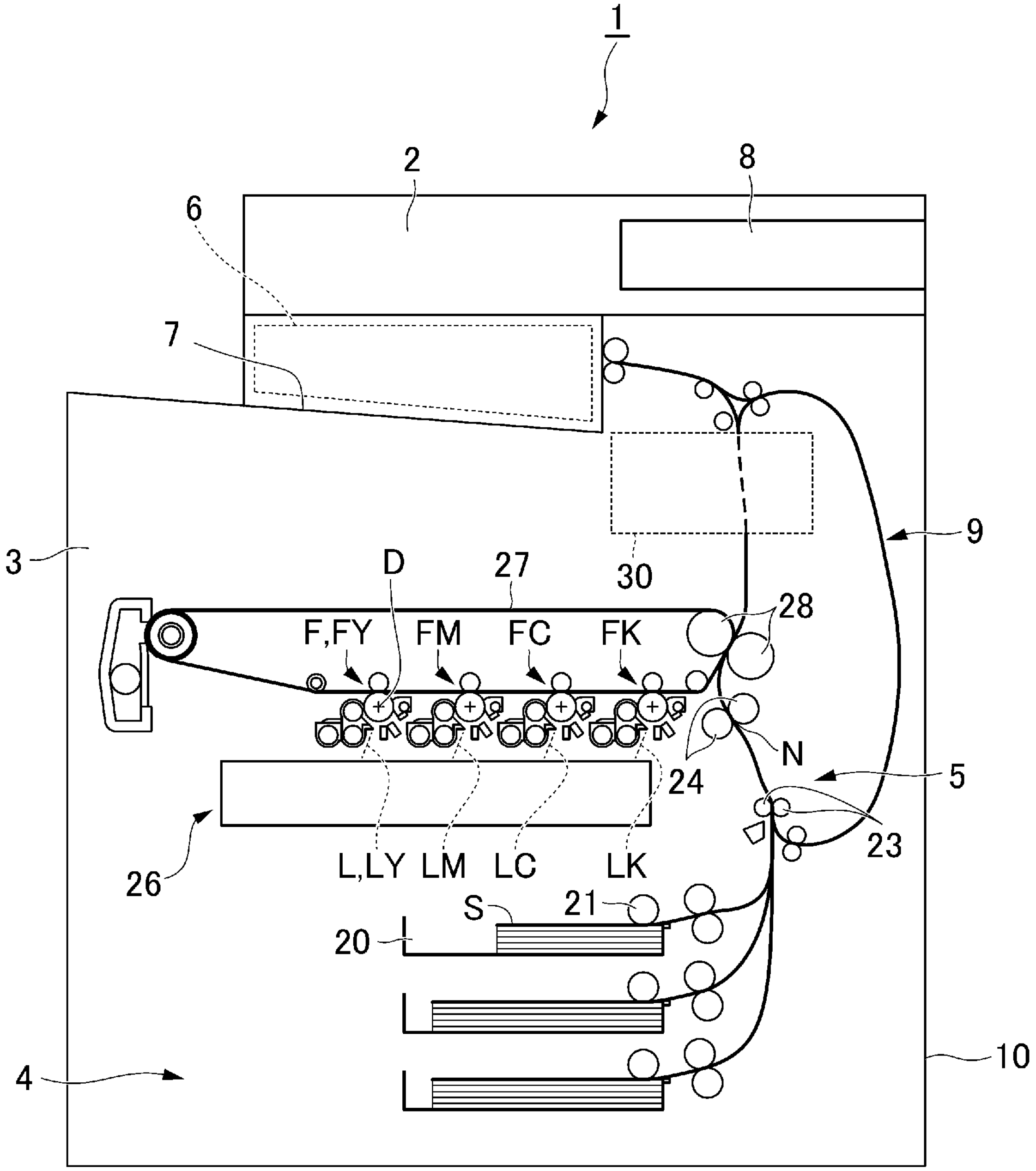
FIG. 1 is a diagram illustrating a schematic configuration of an image forming apparatus according to a first embodiment.

FIG. 1 is a diagram illustrating a schematic configuration of the image forming apparatus according to at least one embodiment.

An image forming apparatus 1 performs a process of forming an image on a sheet S. The sheet may be a paper. The image forming apparatus 1 includes a housing 10, a scanner unit 2, an image forming unit 3, a sheet supply unit 4, a conveyance unit 5, a tray 7, a reversing unit 9, a control panel 8, and a control unit 6.

The housing 10 forms an outer appearance of the image forming apparatus 1.

The scanner unit 2 reads image information of a copy target as shading of light and generates an image signal. The scanner unit 2 outputs the generated image signal to the image forming unit 3.

The image forming unit 3 forms a toner image based on the image signal from the scanner unit 2 or the outside. The toner image is an image formed with toner or another material. The image forming unit 3 transfers the toner image to the front surface of a sheet S. The image forming unit 3 heats and pressurizes the toner image on the front surface of the sheet S to fix the toner image to the sheet S.

The sheet supply unit 4 supplies the sheet S to the conveyance unit 5 one by one at a timing at which the image forming unit 3 forms the toner image. The sheet supply unit 4 includes a sheet accommodation unit 20 and a pickup roller 21.

The sheet accommodation unit 20 accommodates a predetermined kind of sheet S with a predetermined size.

The pickup roller 21 picks up the sheets S one by one from the sheet accommodation unit 20. The pickup roller 21 supplies the sheet S picked up to the conveyance unit 5.

The conveyance unit 5 conveys the sheet S supplied from the sheet supply unit 4 to the image forming unit 3. The conveyance unit 5 includes a conveyance roller 23 and a registration roller 24.

The conveyance roller 23 conveys the sheet S supplied from the pickup roller 21 to the registration roller 24. The conveyance roller 23 allows a front end of the sheet S in a conveyance direction to abut against a nip N of the registration roller 24.

The registration roller 24 curves the sheet S in a nip N and aligns the position of a front end of the sheet S in a conveyance direction. The registration roller 24 conveys the sheet S at a timing at which the image forming unit 3 transfers the toner image to the sheet S.

The image forming unit 3 will be described.

The image forming unit 3 includes a plurality of image forming units F, a laser scanning unit 26, an intermediate transfer belt 27, a transfer unit 28, and a fixing device 30.

The image forming unit F includes a photosensitive drum D. The image forming unit F forms a toner image on the photosensitive drum D in accordance with an image signal. The plurality of image forming units FY, FM, FC, and FK form toner images with yellow, magenta, cyan, and black toner.

Chargers charge the surfaces of the photosensitive drums D. The developers contain a developer including yellow, magenta, cyan, and black toner. The developers develop electrostatic latent images on the photosensitive drums D to form the toner images of respective colors on the photosensitive drums D.

The laser scanning unit 26 scans the charged photosensitive drums D with laser light L to expose the photosensitive drums D. The laser scanning unit 26 exposes the photosensitive drums D with respective types of laser light LY, LM, LC, and LK to form electrostatic latent images on the photosensitive drums D of the image forming units FY, FM, FC, and FK of the respective colors.

The toner images on the surfaces of the photosensitive drums D are primarily transferred to the intermediate transfer belt 27.

The transfer unit 28 transfers the toner images primarily transferred to the intermediate transfer belt 27 to the front surface of the sheet S at a secondary transfer position.

The fixing device 30 heats and pressurizes the toner images transferred to the sheet S to fix the toner images to the sheet S.

The reversing unit 9 reverses the sheet S to form images to the rear surface of the sheet S. The reversing unit 9 reverses the front and rear surfaces of the sheet S discharged from the fixing device 30 by switch-back. The reversing unit 9 conveys the reversed sheet S to the registration roller 24.

In the tray 7, the sheet S on which the images are formed and which is discharged is placed.

The control panel 8 is a part of an input unit with which an operator inputs information to operate the image forming apparatus 1. The control panel 8 includes a touch panel and various hard keys, for example.

The control unit 6 controls each unit of the image forming apparatus 1.

Figure 2:
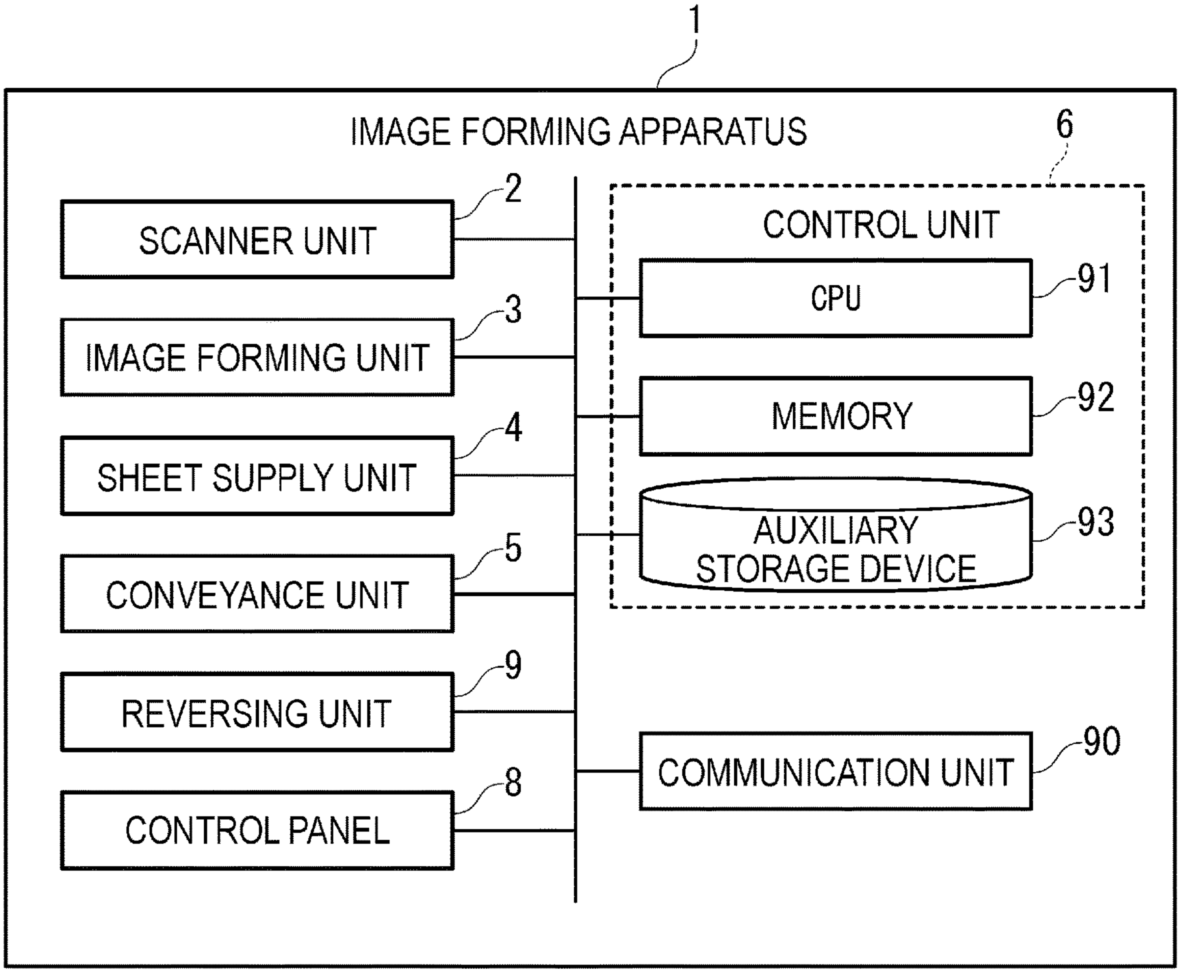
FIG. 2 is a diagram illustrating a hardware configuration of the image forming apparatus.

FIG. 2 is a diagram illustrating a hardware configuration of the image forming apparatus according to at least one embodiment. The image forming apparatus 1 includes a central processing unit (CPU) 91, a memory 92, and an auxiliary storage device 93 connected via a bus and executes a program. The image forming apparatus 1 functions as a device that includes the scanner unit 2, the image forming unit 3, the sheet supply unit 4, the conveyance unit 5, the reversing unit 9, the control panel 8, and a communication unit 90 by executing a program.

The CPU 91 functions as a control unit 6 by executing programs stored in the memory 92 and the auxiliary storage device 93. The control unit 6 controls an operation of each functional unit of the image forming apparatus 1.

The auxiliary storage device 93 is configured using a storage device such as a magnetic hard disk device or a semiconductor storage device, for example. The auxiliary storage device 93 stores information.

The communication unit 90 includes a communication interface for connecting the own image forming apparatus to an external apparatus. The communication unit 90 communicates with the external apparatus via the communication interface.

The fixing device 30 will be described in detail.

Figure 3:
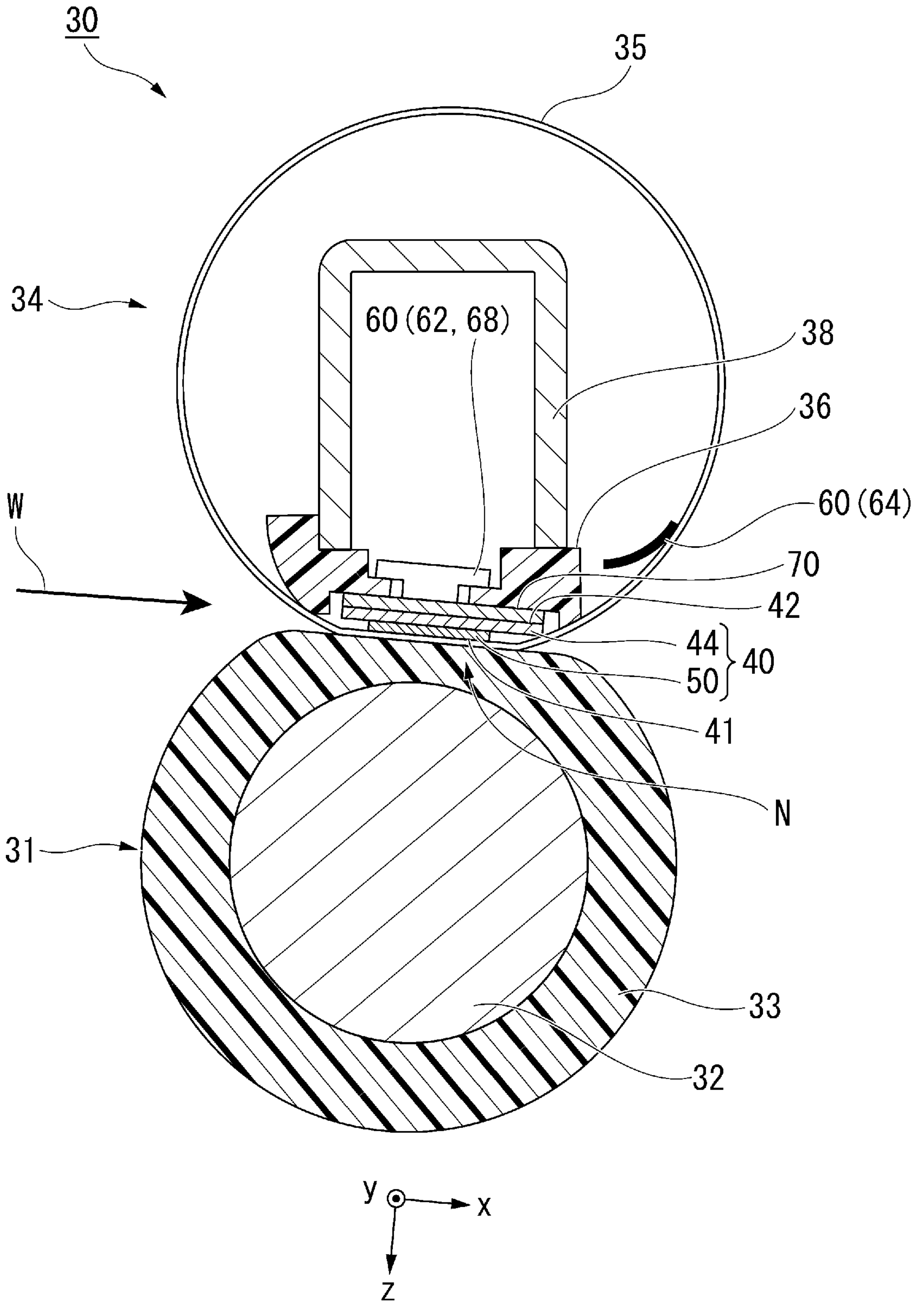
FIG. 3 is a front cross-sectional view illustrating a fixing device.

FIG. 3 is a front cross-sectional view illustrating a fixing device. The fixing device 30 includes a pressurization roller 31 and a heating roller 34. The nip Nis formed between the pressurization roller 31 and the heating roller 34.

In the present specification, z, x, and y directions are defined as follows. The z direction is a direction in which the heating roller 34 and the pressurization roller 31 are arranged. The +z direction is a direction oriented from the heating roller 34 to the pressurization roller 31. The x direction (a first direction) is a conveyance direction of the sheet S in the nip N and the +x direction is downstream of the conveyance direction of the sheet S. The y direction (a second direction) is an axial direction of a cylindrical film 35 of the heating roller 34. A direction oriented to be closer the middle of the cylindrical film 35 in the y direction is referred to as the inside of the y direction in some cases. A direction oriented to be away from the middle of the cylindrical film 35 in the y direction is referred to as the outside of the y direction.

The pressurization roller 31 pressurizes the toner image on the sheet S entering to the nip N. The pressurization roller 31 includes a core grid 32 and an elastic layer 33. The configuration of the pressurization roller 31 is not limited to the above configuration and various configurations can be implemented.

The core grid 32 is formed cylindrically of a metal material such as stainless steel. The elastic layer 33 is formed of an elastic material such as silicon rubber. The elastic layer 33 has a constant thickness on the outer circumferential surface of the core grid 32. A release layer may be formed on the outer circumferential surface of the elastic layer 33 and formed of a resin material such as tetra-fluoroethylene perfluoroalkyl vinyl ether copolymer (PFA).

The pressurization roller 31 is driven to be rotated by a motor. When the pressurization roller 31 is rotated with the nip N being formed, the cylindrical film 35 of the heating roller 34 follows to be rotated. The pressurization roller 31 is rotated with the sheet S being in the nip N to convey the sheet S in a conveyance direction W.

The heating roller 34 heats the toner images on the sheet S entering the nip N. The heating roller 34 includes the cylindrical film (cylindrical body) 35, a heating body unit 40, a heat transmission member (first member) 70, a support member 36, a stay 38, and a thermosensitive element 60. The configuration of the heating roller 34 is not limited to the above configuration and various configurations can be implemented.

The cylindrical film 35 has a cylindrical shape. The cylindrical film 35 includes a base layer, an elastic layer, and a release layer in order from the inner circumferential side. The base layer is formed of a material such as nickel (Ni). The elastic layer is formed of an elastic material such as silicon rubber. The release layer is formed of a material such as a PFA resin.

The heating body unit 40 is inside the cylindrical film 35. A first surface 41 of the heating body unit 40 in the +z direction comes into contact with the inner surface of the cylindrical film 35 via grease.

Figure 4:
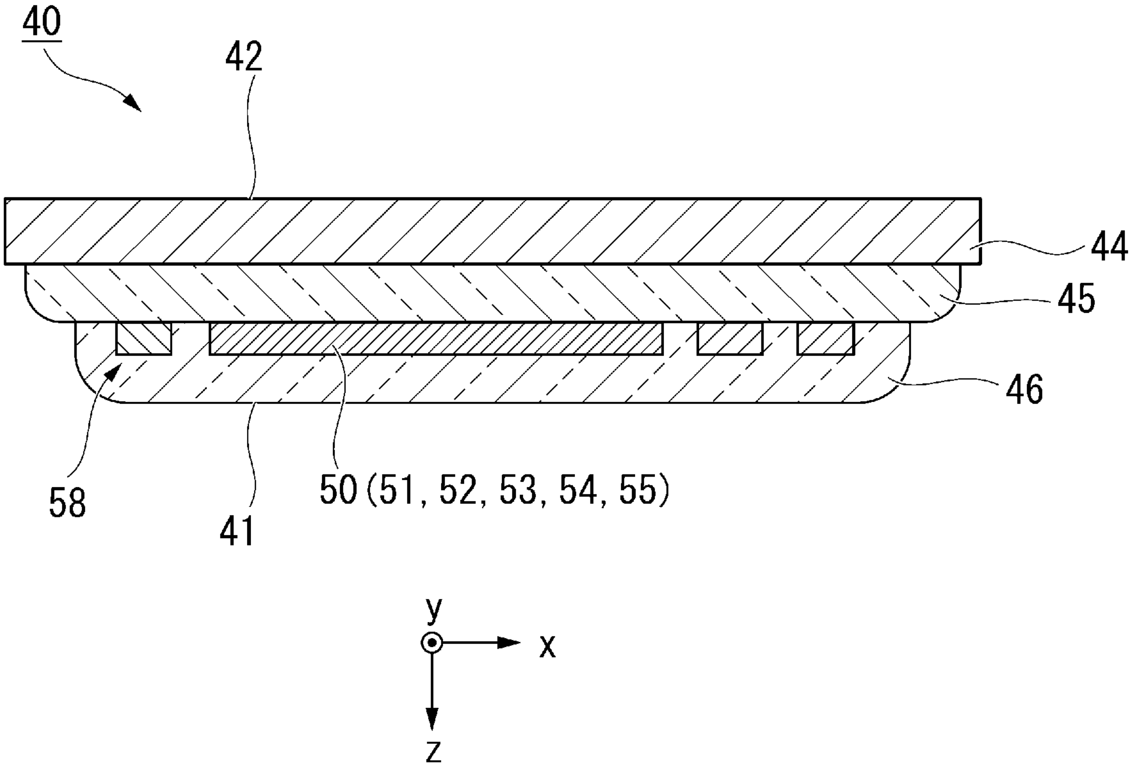
FIG. 4 is a front cross-sectional view illustrating a heating body unit (arrangement)
Figure 5:
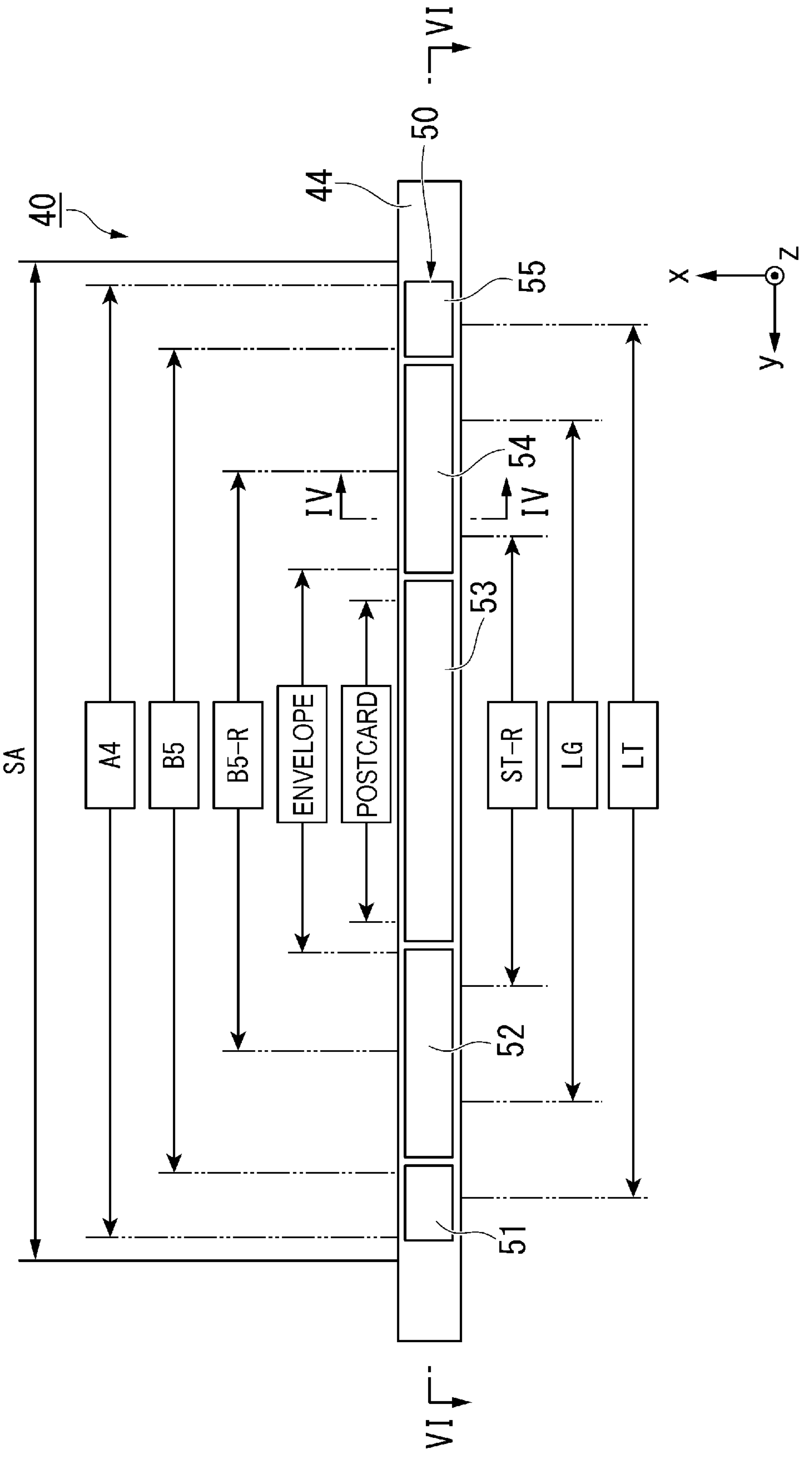
FIG. 5 is a bottom view illustrating the heating body unit.

FIG. 4 is a front cross-sectional view illustrating a heating body unit taken along the line IV-IV of FIG. 5. The heating body unit 40 includes a substrate 44 and a heating body 50.

The substrate 44 is formed of a metal material such as stainless steel or a ceramic material such as aluminum nitride. The substrate 44 is formed in a slender rectangular shape. In the substrate 44, the y direction is a longitudinal direction and the x direction is a transverse direction. In the +z direction of the substrate 44, an insulation layer 45 is formed of a glass material, for example. Similarly to the insulation layer 45 formed in the +z direction of the substrate 44, an insulation layer may be formed in the −z direction of the substrate 44.

The heating body 50 is formed of a silver-palladium alloy or the like. The heating body 50 is conducted via a wiring set 58 to generate heat. The heating body 50 and the wiring set 58 are disposed in the +z direction of the insulation layer 45. A protective layer 46 is formed of a glass material or the like to cover the heating body 50 and the wiring set 58. Similarly to the protective layer 46 formed in the +z direction of the substrate 44, a protective layer may be formed in the −z direction of the substrate 44.

FIG. 5 is a bottom view illustrating the heating body unit (a diagram when viewed in the +z direction). In FIG. 5, the wiring set 58 is not illustrated. In the image forming apparatus 1, the sheets S with various sizes are used. The middle of the sheet S in the y direction is matched with the middle of the fixing device 30 in the y direction so that the sheet S is conveyed in the x direction. A region in which the sheet S can pass in the fixing device 30 is a sheet-passing region SA. The sheet-passing region SA has a maximum sheet-passing width of the sheet S. In the sheet-passing region SA, a length in the y direction is the same as the length of the maximum sheet S in the y direction among the sheets which can pass through the fixing device 30. The cylindrical film 35 is broader than the sheet-passing region SA in the y direction. The length of the heating body 50 in the y direction is smaller than the length of the sheet-passing region SA in the y direction. An outer end of the heating body 50 in the y direction is disposed in the y direction inside the outer end of the sheet-passing region SA in the y direction. The outer end of the substrate 44 in the y direction is disposed in the y direction outside the outer end of the sheet-passing region SA in the y direction.

The heating body 50 includes a plurality of heating body elements 51 to 55 arranged in the y direction. The plurality of heating body elements 51 to 55 are located at different positions in the y direction. The plurality of heating body elements are a first heating body element 51, a second heating body element 52, a third heating body element (a middle heating body element) 53, a fourth heating body element 54, and a fifth heating body element 55. The third heating body element 53 is disposed in the middle of the heating body 50 in the y direction. The first heating body element 51 and the fifth heating body element 55 are disposed at both ends of the heating body 50 in the y direction. The second heating body element 52 is disposed between the first heating body element 51 and the third heating body element 53 in the y direction. The fourth heating body element 54 is disposed in the third heating body element 53 and the fifth heating body element 55 in the y direction. In the example of FIG. 5, the heating body 50 includes five heating body elements, but the number of heating body elements is not limited thereto.

The end sides of the heating body elements 51 to 55 in the y direction are parallel to the x direction. The end sides of the heating body elements in the y direction may intersect the x direction. The facing end sides of the mutually adjacent heating body elements are parallel to each other in the y direction. The substrate 44 supports the plurality of heating body elements 51 to 55.

Figure 6:
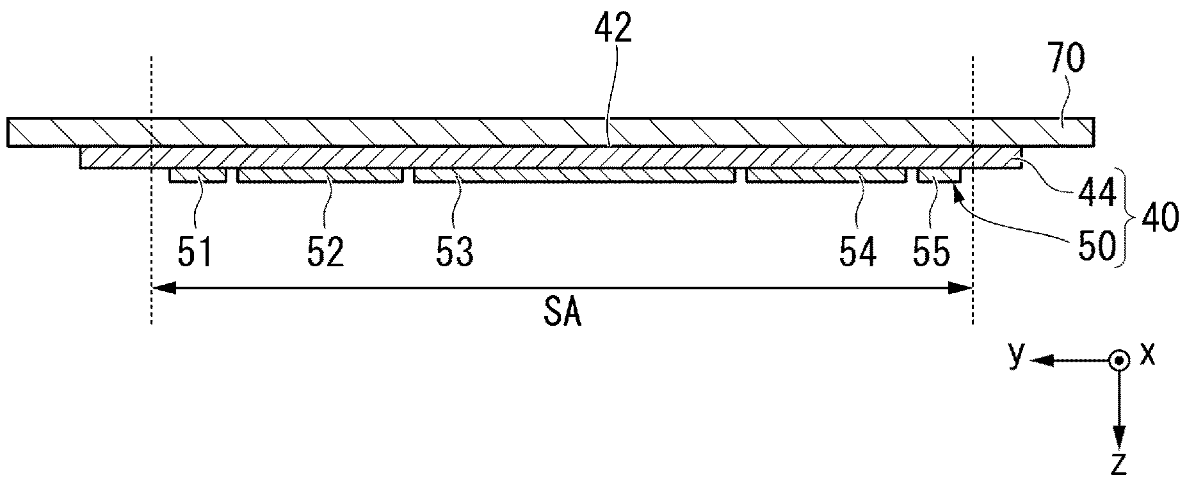
FIG. 6 is a side cross-sectional view illustrating the heating body unit and a heat transmission member.

FIG. 6 is a side cross-sectional view illustrating the heating body unit 40 and a heat transmission member 70 taken along the line VI-VI of FIG. 5.

The heat transmission member 70 is formed of a metal material such as copper with high heat conductivity. The heat transmission member 70 is formed of a material with higher heat conductivity than the substrate 44 of the heating body unit 40. The heat transmission member 70 is disposed on the opposite side to a first surface 41 (see FIG. 4) with the heating body 50 interposed therebetween. The heat transmission member 70 is disposed to come into contact with at least a part of a second surface 42 of the heating body unit 40 in the −z direction. In the example of FIG. 6, the heat transmission member 70 comes into contact with the entire second surface 42 of the heating body unit 40. The heat transmission member 70 comes into contact with a region inside the heating body 50 in the y direction. The length of the heat transmission member 70 in the y direction is greater than the length of the sheet-passing region SA in the y direction. The outer end of the heat transmission member 70 in the y direction is disposed in the y direction outside the outer end of the sheet-passing region SA in the y direction. The outer end of the heat transmission member 70 in the y direction is disposed in the y direction outside the outer end of the substrate 44 in the y direction. The heat transmission member 70 inhibits a curved state of the heating body unit 40.

As illustrated in FIG. 3, the support member 36 is formed of a resin material such as a liquid crystal polymer. The support member 36 is disposed to cover both sides of the heating body unit 40 in the −z direction and the x direction. The support member 36 supports the heating body unit 40 via the heat transmission member 70. Both ends of the support member 36 in the x direction are chamfered. The support member 36 supports the inner circumferential surface of the cylindrical film 35 at both ends of the heating body unit 40 in the x direction.

The stay 38 is formed of a steel plate material or the like. A cross-section of the stay 38 vertical in the y direction is formed in a U shape. The stay 38 is mounted in the −z direction on the support member 36 so that a U-shaped opening is covered by the support member 36. The stay 38 extends in the y direction. Both ends of the stay 38 in the y direction are fixed to the housing 10 of the image forming apparatus 1.

The thermosensitive element 60 is a heater thermometer 62, an automatic temperature adjustment device 68, and a film thermometer 64. The heater thermometer 62 and the automatic temperature adjustment device 68 are located in the −z direction of the heating body unit 40 with the heat transmission member 70 interposed therebetween. The heater thermometer 62 measures temperature of the heating body unit 40 via the heat transmission member 70. The automatic temperature adjustment device 68 blocks conductivity to the heating body 50 when the temperature of the heating body unit 40 detected via the heat transmission member 70 exceeds a predetermined temperature. The film thermometer 64 comes into contact with the inner circumferential surface of the cylindrical film 35 and measures the temperature of the cylindrical film 35.

Heating control of the heating body 50 by the control unit 6 will be described.

The fixing device 30 heats the sheet S with the cylindrical film 35 and fixes the toner images to the sheet S. When the image forming apparatus 1 is pausing, the temperature of the cylindrical film 35 is a temperature lower than a fixing temperature. When the temperature of the cylindrical film 35 increases to the fixing temperature, the image forming apparatus 1 enters a printable state and heating of the sheet S by the fixing device 30 starts. Before the heating of the sheet S starts, the control unit 6 heats the entire heating body 50 to increase the temperature of the cylindrical film 35 to the fixing temperature. The control unit 6 may allow the heating body 50 to start generating heat before the sheet S to which the image forming unit 3 transfers the toner images reaches the entire fixing device 30. The control unit 6 may allow the entire heating body 50 to start generating heat before the image forming unit 3 transfers the toner images to the sheet S. By allowing all the heating body elements 51 to 55 to generate heat, the temperature of the cylindrical film 35 gradually increases up to the fixing temperature. The heat transmission member 70 transmits the heat generated by the heating body 50 to both ends of the cylindrical film 35 in the y direction. Thus, irregularity of the temperature at both ends of the cylindrical film 35 in the y direction is inhibited.

As illustrated in FIG. 5, the sheets S with various sizes pass through the fixing device 30. Sizes of A series such as A4 are regulated in the international standard ISO216 that regulates dimensions of papers. Sizes of B series such as B5 are regulated in ISO216 or Japanese Industrial Standards JIS-B series. The sizes of envelopes are regulated as C series in ISO269. LT is a letter size and is regulated as ANSI A in American National Standards Institute ANSI/ASME Y14.1. LG is a legal size. ST-R is a statement size and is half of the letter size.

The control unit 6 allows the heating body 50 to generate heat so that the temperature of the cylindrical film 35 in a region in which the sheet S passes becomes a predetermined fixing temperature. The sheet S passes through the fixing device 30 so that the middle of the sheet S in the y direction matches the middle of the fixing device in the y direction. In the region through which the sheet S passes, the sheet S absorbs the heat from the cylindrical film 35. In a region in which the sheet S does not pass, the temperatures of the cylindrical film 35 and the heating body unit 40 increase. When the many sheets S pass through the fixing device 30 per unit time, the heating amount of the heating body 50 increases. In the region in which the sheet S does not pass, the increase in the temperature of the cylindrical film 35 and the heating body unit 40 is large.

The control unit 6 allows only predetermined heating body elements of the heating body 50 to generate heat based on information regarding the size of the sheet S passing through the fixing device 30. When the length of the sheet S in the y direction is small, the control unit 6 allows only the third heating body element 53 to generate heat. When the length of the sheet S in the y direction is intermediate, the control unit 6 allows only the second heating body element 52, the third heating body element 53, and the fourth heating body element 54 to generate heat. When the length of the sheet S in the y direction is large, the control unit 6 allows all the heating body elements 51 to 55 to generate heat. The heat generation of the third heating body element 53, the second heating body element 52 and the fourth heating body element 54, and the first heating body element 51 and the fifth heating body element 55 are independently controlled. The heat generation of the second heating body element 52 and the fourth heating body element 54 are controlled similarly. The heat generation of the first heating body element 51 and the fifth heating body element 55 is similarly controlled.

The control unit 6 allows the heating body 50 to generate heat inside the outer end of the sheet-passing region SA in the y direction. The control unit 6 allows the heating body 50 to generate heat within a range narrower than the length of the sheet S in the y direction. The control unit 6 allows the heating body 50 to generate heat within a range in the y direction inside the outer end of the sheet S in the y direction. The control unit 6 allows all the heating body elements in the y direction inside the outer end of the sheet-passing region SA to generate heat among the plurality of heating body elements 51 to 55. The control unit 6 allows all the entire heating body elements disposed in the y direction inside the outer end of the sheet S in they direction to generate heat. For example, when sheet S has the ST-R size, the control unit 6 allows only the third heating body element 53 to generate heat. The entire third heating body element 53 is disposed, but the other entire heating body elements 51, 52, 54, and 55 are not disposed in the y direction inside the outer end of the sheet S with the ST-R size. For example, when the sheet S has the letter (LT) size, the control unit 6 allows only the second heating body element 52, the third heating body element 53, and the fourth heating body element 54 to generate heat. The entire second heating body element 52, the entire third heating body element 53, and the entire fourth heating body element 54 are disposed, but the other entire heating body elements 51 and 55 are not disposed in the y direction inside the outer end of the sheet S with the LT size. Even when the sheet S has the B5 or A4 size, the control unit 6 allows only the second heating body element 52, the third heating body element 53, and the fourth heating body element 54 to generate heat. When the length of the sheet S in the y direction is larger than the length of the heating body 50 in the y direction, the control unit 6 allows all the heating body elements 51 to 55 to generate heat.

The control unit 6 allows the heating body 50 to generate heat within a range in the y direction inside the outer end of the sheet S in the y direction. An increase in the temperature of the heating body unit 40 and the cylindrical film 35 is inhibited in a range outside the outer end of the sheet S in the y direction. As illustrated in FIG. 3, an increase in the temperature of the support member 36 supporting the heating body unit 40 via the heat transmission member 70 is inhibited. The temperature of the support member 36 formed of a resin material is inhibited to a temperature less than a heatproof temperature. The temperature at both ends of the cylindrical film 35 in the y direction is inhibited to a temperature less than a heatproof temperature.

Since the heating body 50 does not generate heat at the outer ends of the sheet S in the y direction, an increase in the temperature of the cylindrical film 35 and the heating body unit 40 is inhibited. As illustrated in FIG. 6, the heat transmission member 70 comes into contact with the entire second surface 42 of the heating body unit 40. The outer end of the heat transmission member 70 in the y direction is disposed outside the outer end of the sheet-passing region SA in the y direction. The outer end of the substrate 44 of the heating body unit 40 in the y direction is also disposed outside the outer end of the sheet-passing region SA in the y direction. A region outside the sheet-passing region SA in the y direction is a region in which the sheet S does not pass and the temperatures of the cylindrical film 35 and the heating body unit 40 are high. The heat of the heating body unit 40 in the region in which the sheet S does not pass transmits via the heat transmission member 70 to the heating body unit 40 in the region in which the sheet S passes. Although the heating body 50 does not generate heat at the outer end of the sheet S in the y direction, the temperature of the cylindrical film 35 increases to the fixing temperature.

As described in detail above, the image forming apparatus 1 according to at least one embodiment includes the image forming unit 3, the fixing device 30, and the control unit 6. The image forming unit 3 forms an image on the sheet S. The fixing device 30 fixes the image to the sheet S. The fixing device 30 includes the cylindrical film 35, the heating body 50, the heating body unit 40, and the heat transmission member 70. The heating body 50 includes the plurality of heating body elements 51 to 55 disposed inside the cylindrical film 35 and arranged in the y direction. The heating body unit 40 includes the heating body 50 and comes into contact with the internal surface of the cylindrical film 35 in the first surface 41. The heat transmission member 70 is disposed opposite to the first surface 41 with the heating body 50 interposed therebetween. The outer end of the heat transmission member 70 in the y direction is disposed in the y direction outside the outer end of the sheet S in the y direction. The control unit 6 allows the heating body 50 to generate heat within the range in the y direction inside the outer end of the sheet S in the y direction.

The control unit 6 allows the heating body 50 to generate heat within the range inside the outer end of the sheet S in the y direction. An excessive increase in temperature of the image forming apparatus is inhibited within the range outside the outer end of the sheet S in the y direction.

The outer end of the heat transmission member 70 in the y direction is disposed outside the outer end of the sheet S in the y direction. The heat of the heating body unit 40 outside the outer end of the sheet S in the y direction transmits to the inside of the outer end of the sheet S in the y direction via the heat transmission member 70. At the outer end of the sheet S in the y direction, the temperature of the cylindrical film 35 increases to the fixing temperature.

The control unit 6 allows the heating body 50 to generate heat within the range in the y direction inside the outer end of the sheet S with the letter size in the y direction. Within the range outside the outer end of the sheet S with the letter size in the y direction, the excessive increase in the temperature of the image forming apparatus is suppressed. At the outer end of the sheet S with the letter size in the y direction, the temperature of the cylindrical film 35 increases to the fixing temperature.

The control unit 6 allows the hating body 50 to generate heat within the range in the y direction inside the outer end of the sheet S with the A4 size in the y direction.

The excessive increase in the temperature of the image forming apparatus is inhibited within the range outside the outer end of the sheet S with the A4 size in the y direction. At the outer end of the sheet S with the A4 size in the y direction, the temperature of the cylindrical film 35 increases to the fixing temperature.

A region in which the sheet S can pass in the fixing device 30 is referred to as the sheet-passing region SA. The outer end of the heat transmission member 70 in the y direction is disposed in the y direction outside the outer end of the sheet-passing region SA in the y direction.

At the outer end of the sheet S with any of all the sizes in the y direction, the temperature of the cylindrical film 35 increases to the fixing temperature.

The heat transmission member 70 comes into contact with at least a part of the second surface 42 opposite to the first surface 41 of the heating body unit 40.

Since the heat transmission member 70 comes into contact with the heating body unit 40, the heat transmits to a space between the heat transmission member 70 and the heating body unit 40. The heat transmission member 70 and the heating body unit 40 are separate members and the degree of design of the heat transmission member 70 is improved.

The control unit 6 allows all the entire heating body elements arranged in the y direction inside the outer end of the sheet S in the y direction to generate heat among the plurality of heating body elements 51 to 55 in the heating body 50.

At the outer end of the sheet S in the y direction, the temperature of the cylindrical film 35 increases to the fixing temperature.

The control unit 6 allows all the heating body 50 to generate heat before heating of the sheet S starts.

The temperature of the cylindrical film 35 quickly increases to the fixing temperature. Irregularity of the temperature at both ends of the cylindrical film 35 in the y direction is inhibited.

Second Embodiment

Figure 7:
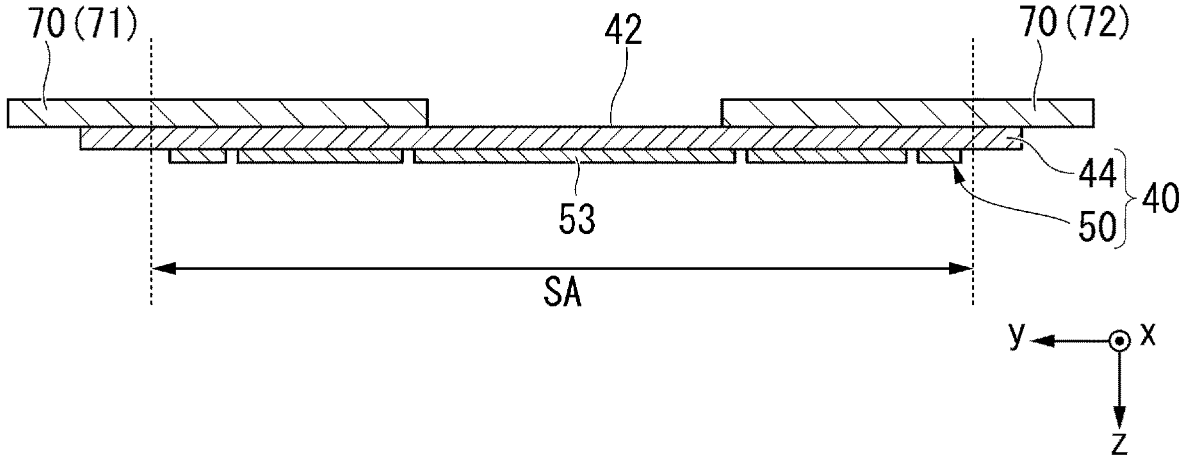
FIG. 7 is a side cross-sectional view illustrating a heating body unit and a heat transmission member according to a second embodiment.

FIG. 7 is a side cross-sectional view illustrating a heating body unit and a heat transmission member taken along the line VI-VI of FIG. 5 according to a second embodiment. The second embodiment is different from the first embodiment in that the heat transmission member 70 includes a first heat transmission member 71 and a second heat transmission member 72. Similar portions to those of the first embodiment will not be described in some cases in the second embodiment.

The heat transmission member 70 includes the first heat transmission member 71 and a second heat transmission member 72 disposed to be separated in the y direction. The first heat transmission member 71 and the second heat transmission member 72 are in contact with at least parts of the second surface 42 of the heating body unit 40. In the example of FIG. 7, the first heat transmission member 71 and the second heat transmission member 72 are in contact with outer portions of the heating body unit 40 on the second surface 42 in the y direction.

The outer ends of the first heat transmission member 71 and the second heat transmission member 72 are disposed in the y direction outside the outer ends of the sheet-passing region SA in the y direction. The heat of the heating body unit 40 outside the outer end of the sheet-passing region SA in the y direction transmits to the inside in the y direction via the first heat transmission member 71 and the second heat transmission member 72.

The inner ends of the first heat transmission member 71 and the second heat transmission member 72 in the y direction are disposed in the y direction inside the outer ends of the heating body 50 in the y direction.

When the length of the sheet S in the y direction is longer than the heating body 50, heat transmits to the outer ends of the sheet S in the y direction from the first heat transmission member 71 and the second heat transmission member 72. At the outer ends of the sheet S in the y direction, the temperature of the cylindrical film 35 increases to the fixing temperature.

The inner ends of the first heat transmission member 71 and the second heat transmission member 72 in the y direction are disposed in the y direction inside the outer ends of the third heating body element 53 in the y direction.

Heat transmits to the outer ends of the sheet S with any of all the sizes in the y direction from the first heat transmission member 71 and the second heat transmission member 72. At the outer ends of the sheet S with any of all the sizes in the y direction, the temperature of the cylindrical film 35 increases to the fixing temperature.

Third Embodiment

Figure 8:
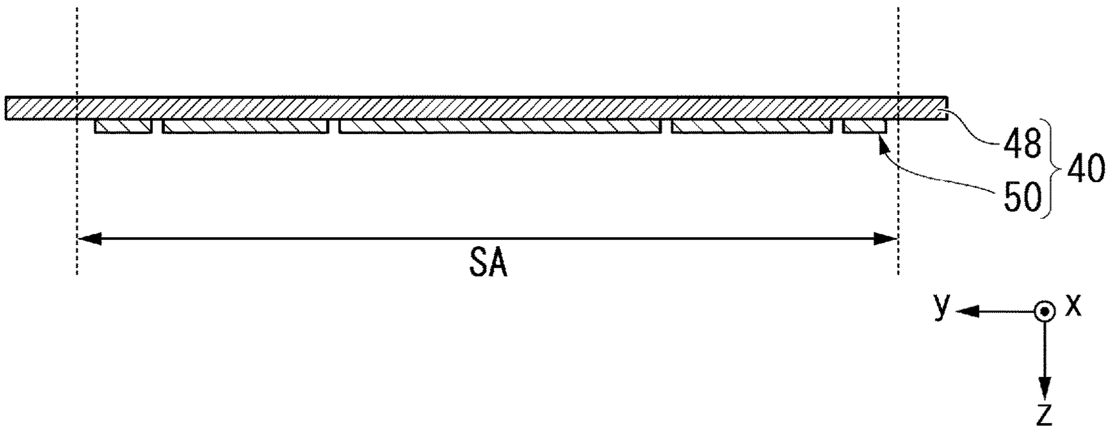
FIG. 8 is a side cross-sectional view illustrating a heating body unit according to a third embodiment.

FIG. 8 is a side cross-sectional view illustrating a heating body unit taken along the line VI-VI of FIG. 5 according to a third embodiment. The third embodiment is different from the first embodiment in that the heating body unit 40 includes a heat transmission substrate (a first member) 48. Similar portions to those of the first embodiment will not be described in some cases in the third embodiment.

Instead of the substrate 44 of the heating body unit 40 according to the first embodiment, the heating body unit 40 according to the third embodiment includes the heat transmission substrate 48. The heat transmission substrate 48 is disposed on an opposite side to the first surface 41 (see FIG. 4) with the heating body 50 interposed therebetween. The heat transmission substrate 48 is formed of a material with higher heat conductivity than the heating body 50. For example, the heat transmission substrate 48 is formed of a metal material such as copper or aluminum. The outer end of the heat transmission substrate 48 in the y direction is disposed in the y direction outside the outer end of the sheet-passing region SA. Heat of the heating body unit 40 outside the outer end of the sheet S in the y direction transmits to an inside of the outer end of the sheet S in the y direction via the heat transmission substrate 48. At the outer end of the sheet S in the y direction, the temperature of the cylindrical film 35 increases to the fixing temperature.

The image forming apparatus 1 according to at least one embodiment is a kind of image processing apparatus and the fixing device 30 is a kind of heating device. On the other hand, the image processing apparatus may be a decoloring apparatus and the heating device may be a decoloring unit. The decoloring device performs a process of decoloring (erasing) an image formed on a sheet with decolorable toner. The decoloring unit heats a decoloring toner image formed on a sheet passing through a nip to perform decoloring.

According to at least one of the embodiments described above, the control unit 6 that allows the heating body 50 to generate heat within a range in the y direction inside the outer end of the sheet S in the y direction is included. Thus, it is possible to inhibit an excessive increase in the temperature.

While certain embodiments have been described these embodiments have been presented by way of example only, and are not intended to limit the scope of the disclosure. Indeed, the novel embodiments described herein may be embodied in a variety of other forms: furthermore various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. An image forming apparatus comprising:

at least one image former configured to form an image on a sheet;

a heating body arrangement having a sheet-passing region, the sheet-passing region coming into contact with the sheet to fix the image to the sheet moving in a first direction, the heating body arrangement including a film-shaped cylindrical body, a substrate, and a heating body, the film-shaped cylindrical body having an axis extending in an axial direction, and the heating body being wider than the sheet-passing region in the axial direction orthogonal to the first direction;

a heat transmission arrangement disposed on an opposite side to a first surface of the heating body, with the heating body interposed between the heat transmission arrangement and the first surface, and the heating body having an outer end disposed outside an outer end of the sheet-passing region in the axial direction, the substrate arranged between the heat transmission arrangement and the heating body, the heat transmission arrangement being wider than the substrate in the axial direction;

a roller configured to form a nip with the film-shaped cylindrical body at the heating body; and a controller configured to allow the heating body to generate heat inside the outer end of the sheet-passing region in the axial direction, wherein the heat transmission arrangement is formed of a material with higher heat conductivity than the substrate.

2. The apparatus according to claim 1, wherein the outer end of the heat transmission arrangement is disposed outside the outer end of the sheet-passing region in the axial direction.

3. The apparatus according to claim 1, wherein the heat transmission arrangement comes into contact with a second surface opposite to the first surface of the heating body arrangement.

4. The apparatus according to claim 1, wherein the heating body includes a plurality of heating body elements located at different positions in the axial direction, and wherein the controller is configured to allow all the heating body elements located inside the outer end of the sheet-passing region to generate heat among the plurality of heating body elements in the axial direction.

5. The apparatus according to claim 1, wherein the heating body arrangement includes a plurality of heating body elements, the heating body elements located at different positions in the axial direction, and the substrate supporting the plurality of heating body elements.

6. The apparatus according to claim 1, wherein the heating body includes a plurality of heating body elements located at different positions in the axial direction, and the controller is configured to allow all the plurality of heating body elements to generate heat before the sheet on which the image is formed by the at least one image former comes into contact with the cylindrical body.

7. The apparatus according to claim 1, wherein the sheet has a letter size, and the controller is configured to allow the heating body to generate heat within a range inside an outer end of the sheet in the axial direction.

8. The apparatus according to claim 1, wherein the sheet has an A4 size, and the controller is configured to allow the heating body to generate heat within a range inside an outer end of the sheet in the axial direction.

9. The apparatus according to claim 1, wherein the at least one image former includes a plurality of image formers each configured to provide a different image color to the sheet.

10. The apparatus according to claim 1, wherein the heating body includes a plurality of heating body elements located at different positions in the axial direction, and wherein the controller is configured to allow the plurality of heating body elements to independently generate heat.

11. An image forming apparatus comprising:

at least one image former configured to form an image on a sheet;

a heating body arrangement having a sheet-passing region, the sheet-passing region coming into contact with the sheet to fix the image to the sheet moving in a first direction, the heating body arrangement including a film-shaped cylindrical body, a substrate, and a heating body, the film-shaped cylindrical body having an axis extending in an axial direction, and the heating body being wider than the sheet-passing region in the axial direction orthogonal to the first direction;

a heat transmission arrangement disposed on an opposite side to a first surface of the heating body, with the heating body interposed between the heat transmission arrangement and the first surface, and the heating body having an outer end disposed outside an outer end of the sheet-passing region in the axial direction, the substrate arranged between the heat transmission arrangement and the heating body, the heat transmission arrangement being wider than the substrate in the axial direction;

a roller configured to form a nip with the film-shaped cylindrical body at the heating body; and a controller configured to allow the heating body to generate heat inside the outer end of the sheet-passing region in the axial direction, wherein the heat transmission arrangement comes into contact with a second surface opposite to the first surface of the heating body arrangement, wherein the heat transmission arrangement includes first and second heat transmission bodies separated from each other in the axial direction, and inner ends of the first and second heat transmission bodies are disposed inside the outer end of the heating body in the axial direction.

12. The apparatus according to claim 11, wherein the heating body includes a plurality of heating body elements located at different positions in the axial direction, wherein the plurality of heating body elements include a middle heating body element disposed in the middle in the axial direction, and the inner ends of the first and second heat transmission bodies are disposed inside the outer end of the middle heating body element in the axial direction.

13. The apparatus according to claim 11, wherein the first and second heat transmission bodies include a metal material.

14. A fixer comprising:

a heating body arrangement having a sheet-passing region, the sheet-passing region coming into contact with a sheet to fix an image to the sheet moving in a first direction, the heating body arrangement including a film-shaped cylindrical body, a substrate, and a heating body, the film-shaped cylindrical body having an axis extending in an axial direction, and the heating body being wider than the sheet-passing region in the axial direction orthogonal to the first direction;

a heat transmission arrangement disposed on an opposite side to a first surface of the heating body, with the heating body interposed between the heat transmission arrangement and the first surface, and the heating body having an outer end disposed outside an outer end of the sheet-passing region in the axial direction, the substrate arranged between the heat transmission arrangement and the heating body, the heat transmission arrangement being wider than the substrate in the axial direction; and a roller configured to form a nip with the film-shaped cylindrical body at the heating body, wherein the heating body is arranged to generate heat inside the outer end of the sheet-passing region in the axial direction, wherein the heating body arrangement includes a plurality of heating body elements, the heating body elements located at different positions in the axial direction, and the substrate supporting the plurality of heating body elements, and the heat transmission arrangement is formed of a material with higher heat conductivity than the substrate.

15. The fixer according to claim 14, wherein the outer end of the heat transmission arrangement is disposed outside the outer end of the sheet-passing region in the axial direction.

16. The fixer according to claim 14, wherein the heat transmission arrangement comes into contact with a second surface opposite to the first surface of the heating body arrangement.

17. The fixer according to claim 16, wherein the heat transmission arrangement includes first and second heat transmission bodies separated from each other in the axial direction, and inner ends of the first and second heat transmission bodies are disposed inside the outer end of the heating body in the axial direction.

18. The fixer according to claim 17, wherein the heating body includes a plurality of heating body elements located at different positions in the axial direction, wherein the plurality of heating body elements include a middle heating body element disposed in the middle in the axial direction, and the inner ends of the first and second heat transmission bodies are disposed inside the outer end of the middle heating body element in the axial direction.

* * * * *